United States Patent
Batchelder et al.

(10) Patent No.: US 6,578,596 B1
(45) Date of Patent: Jun. 17, 2003

(54) APPARATUS AND METHOD FOR THERMOPLASTIC EXTRUSION

(75) Inventors: John Samuel Batchelder, Somers, NY (US); Robert L. Zinniel, Plymouth, MN (US)

(73) Assignee: Stratasys, Inc., Eden Prairie, MN (US)

(*) Notice: Subject to any disclaimer, the term of this patent is extended or adjusted under 35 U.S.C. 154(b) by 179 days.

(21) Appl. No.: 09/837,813

(22) Filed: Apr. 18, 2001

Related U.S. Application Data (60) Provisional application No. 60/198,053, filed on Apr. 18, 2000.

(51) Int. Cl.[7] ................................................. F15C 1/04
(52) U.S. Cl. ................ 137/15.09; 137/334; 137/338; 137/13; 137/828
(58) Field of Search ..................... 137/13, 341, 828, 137/334, 338, 15.09

(56) References Cited

U.S. PATENT DOCUMENTS

| | | | |
|---|---|---|---|
| 2,742,669 A | * 4/1956 | Rhodes ...................... 137/828 |
| 3,704,198 A | * 11/1972 | Prentice ..................... 137/828 |
| 3,716,318 A | * 2/1973 | Erik et al. .................. 425/550 |
| 4,082,109 A | 4/1978 | Sun et al. ................... 137/340 |
| 4,269,212 A | 5/1981 | Kaartinen ................... 137/13 |
| 4,396,031 A | 8/1983 | Peterson et al. ............. 137/13 |
| 4,460,398 A | 7/1984 | Sasaki ........................ 65/327 |
| 4,623,307 A | 11/1986 | Froeschke .................... 425/8 |
| 4,778,642 A | 10/1988 | Lee et al. ................... 264/510 |
| 4,922,082 A | 5/1990 | Bredt et al. ................. 219/541 |
| 4,989,626 A | 2/1991 | Takagi et al. ................ 137/13 |
| 5,059,266 A | 10/1991 | Yamane et al. ............... 156/64 |
| 5,101,848 A | 4/1992 | Kojima et al. ................ 137/13 |
| 5,121,329 A | 6/1992 | Crump ........................ 700/119 |
| 5,136,515 A | 8/1992 | Helinski .................... 364/468 |
| 5,260,009 A | 11/1993 | Penn ......................... 264/40.1 |
| 5,311,896 A | * 5/1994 | Kaartinen ................... 137/15 |
| 5,320,250 A | 6/1994 | La et al. .................... 222/1 |
| 5,406,969 A | 4/1995 | Gray et al. .................. 137/13 |
| 5,555,176 A | 9/1996 | Menhennett et al. ....... 364/468.25 |
| 5,633,021 A | 5/1997 | Brown et al. ................ 425/375 |
| 5,975,493 A | 11/1999 | Ellingson et al. ........... 251/212 |
| 5,988,197 A | * 11/1999 | Colin et al. ................ 137/13 |
| 6,136,252 A | 10/2000 | Bedal et al. ................ 264/308 |
| 6,238,613 B1 | 5/2001 | Batchelder et al. ......... 264/404 |

\* cited by examiner

Primary Examiner—A. Michael Chambers
(74) Attorney, Agent, or Firm—Kinney & Lange, P.A.

(57) ABSTRACT

An apparatus and method for controlling the extrusion of thermoplastic through one or more discharge orifices is described. An apparatus comprises one or more thermally conductive flow tubes defining flow channels in a heated thermally conductive body and terminating in discharge orifices. Each flow channel may be independently valved on and off, by selectively supplying a flow of coolant. An array of flow channels can be independently opened and closed in a predetermined pattern, so as to vary the extrudate configuration of thermoplastic emerging from the discharge orifices. By extruding thermoplastic layer-by-layer onto a base in this manner, a three-dimensional object may be formed.

43 Claims, 4 Drawing Sheets

APPARATUS AND METHOD FOR THERMOPLASTIC EXTRUSION

CROSS-REFERENCE TO RELATED APPLICATION(S)

This application claims priority to provisional application Ser. No. 60/198,053, filed Apr. 18, 2000.

BACKGROUND OF THE INVENTION

This invention relates to thermoplastic extrusion technologies. More particularly, this invention relates to extrusion of thermoplastic in a predetermined spatial pattern under computer control.

Thermoplastic extrusion technologies perform rapid prototyping of three-dimensional objects by selectively extruding a molten thermoplastic from an extrusion head while moving the extrusion head in three dimensions with respect to a base. The thermoplastic is extruded in fluent strands (also termed "beads" or "roads") that solidify after being deposited. Movement of the extrusion head with respect to the base is performed under computer control, in accordance with design data provided from a computer aided design (CAD) system. Crump U.S. Pat. No. 5,121,329, Batchelder et al. U.S. Pat. No. 5,764,521 and Batchelder et al. U.S. Pat. No. 5,968,561, commonly assigned to Stratasys, Inc., the assignee of the present invention, describe the rapid prototyping deposition modeling technology and are hereby incorporated by reference as if set forth fully herein.

In existing thermoplastic extrusion technologies, the configuration of the extrudate is adjustable in quantity and flow rate but not in spatial configuration. The flow rate of material out of an orifice is carefully controlled, but the spatial configuration (e.g., road width) of the flow is not readily alterable.

As the size of the element of additive material shrinks, a prototype part built with those additive elements will typically represent its CAD model parent with greater fidelity. For example, depositing layers of thermoplastic half as thick using extruded roads that are half as wide will improve the feature detail and surface finish of a model by about a factor of two. Unfortunately, with a constant deposition velocity, the time to build the model with this factor of two increase in resolution increases by about a factor of eight. The average deposition velocity can be increased but this requires an increase in the mechanical stiffness of the extruder and greater cost of the robot or gantry that positions the extruder with respect to the model.

This speed/resolution conflict has been resolved in other rapid prototyping technologies by replacing vector motion of a single source with raster motion of multiple ink jets. An example is the Actua™ ink jet rapid prototyping system from 3D Systems, Inc., which forms three-dimensional models from a wax-like material. The ink jets are individually controlled so that any number of the jets will deposit the modeling material at a given time. Ink jet-based technologies are attractive for extruding discrete quantities of relatively low viscosity materials, however, ink jetting techniques have difficulty with high viscosity materials (such as thermoplastics) and particulate or fiber-filled materials. These materials tend to clog the jets. Also, in thermoplastic extrusion, "wetting" of the base by the extruded material serves to separate high viscosity materials from the extrusion head, while ink-jetted materials must break free due to the jetting momentum.

There is an unmet need for a computer-controlled extrusion apparatus suitable for dispensing thermoplastic in an extrudate configuration that may be varied quickly during deposition, in accordance with movement of the apparatus in a predetermined spatial pattern relative to a base.

BRIEF SUMMARY OF THE INVENTION

The present invention is an apparatus and method for controlling the extrusion of thermoplastic through one or more discharge orifices using a freeze valve technique. An apparatus comprises one or more thermally conductive hollow tubes defining flow channels in a heated thermally conductive body and terminating in discharge orifices. An inlet and an outlet region of each flow tube is captured within the thermally conductive body, and a mid-section of the flow tube passes through an insulated cavity of the body. The apparatus further comprises a means for contacting a flow of coolant with a portion of the flow tube mid-section. The flow of coolant is provided at a temperature lower than a lowest flowable temperature of the thermoplastic. Contacting the flow of coolant with the flow tube mid-section closes the flow channel due to heat transfer to the coolant causing solidification of the thermoplastic in a region of the flow tube mid-section. By alternately providing and ceasing the coolant flow, the flow channel is alternately valved off and on and thermoplastic is selectively extruded through the discharge orifice.

An plurality of flow channels according to the present invention can be independently opened and closed in a predetermined pattern by selectively contacting the flow of coolant with each flow channel, so as to vary the configuration of thermoplastic discharged through an array of the flow channel orifices. In a preferred embodiment, thermoplastic is extruded onto a base in a preselected, variable extrudate configuration by moving an array of discharge orifices relative to the base in a predetermined spatial pattern in synchrony with selectively and independently providing and stopping the flow of coolant. By selectively extruding a thermoplastic layer-by-layer onto a base in a three-dimensional spatial pattern, a three-dimensional object may be formed rapidly without loss of resolution.

BRIEF DESCRIPTION OF THE DRAWINGS

FIG. 1.a. is a detailed view of the freeze valve apparatus of FIG. 1, taken along a line 1—1 of FIG. 1.

DETAILED DESCRIPTION

The present invention alters the flow resistance of a flow channel using a freeze valve technique. The temperature dependant viscosity and elasticity of a flowable thermoplastic allows the channel to be valved on and valved off by controlling the temperature in the channel.

Figure 1:
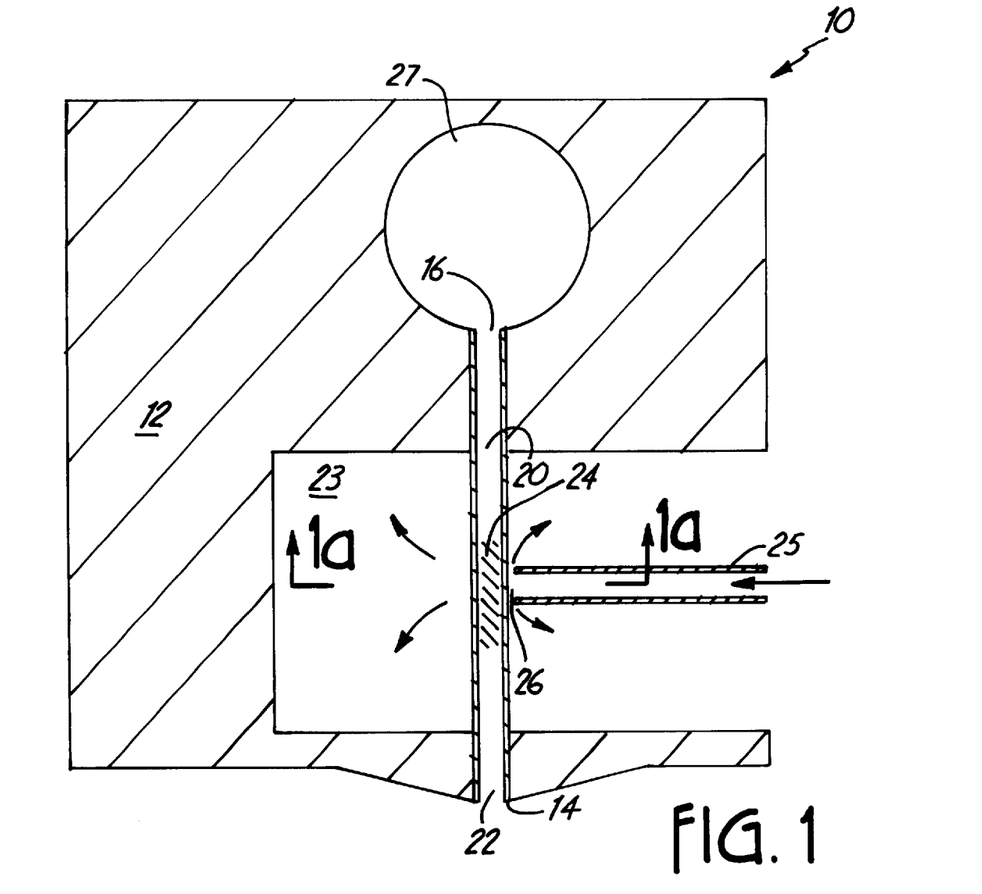
FIG. 1 is a sectional view of a first exemplary embodiment of a freeze valve apparatus according to the present invention.

A first exemplary embodiment of a freeze valve apparatus according to the present invention is shown in FIG. 1. The freeze valve apparatus 10 is comprised of a heated body 12, a hollow flow tube 14 and a coolant inlet tube 25. Heated body 12 is made of a thermally conductive material, such as aluminum, and is ohmically heated. As shown, heated body 12 has a single piece construction. Those skilled in the art will recognize, however, that the heated body may take numerous forms, including having a multi-piece construction. Flow tube 14 extends through the heated body 12 and defines a thermoplastic flow channel 20. Flow tube 14 is made of a thermally conductive material, such as 316 stainless steel. An open top end of the flow tube 14 defines an inlet 16 to the flow channel 20, while an open bottom end of the flow tube 14 defines an exit orifice 22. A mid-section of the flow tube 14 passes through a cavity 23 in the heated body 12. The portion of the flow tube 14 located above the mid-section and captured within the heated body 12 is termed the inlet region, while the portion of the flow tube 14 located below the mid-section and captured within the heated body 12 is termed the outlet region.

As shown, the top end of flow tube 14 is flowably connected to a supply manifold 27. In the embodiments shown, the supply manifold 27 is a chamber within heated body 12. The supply manifold 27 receives a flow of pressurized thermoplastic and supplies the thermoplastic flow to the flow channel 20. Alternatively, the supply manifold 27 could be within a separate heated container flowably connected to the flow tube 14. Thermoplastic that flows through the flow channel 20 will exit through the discharge orifice 22.

Figure 1A:
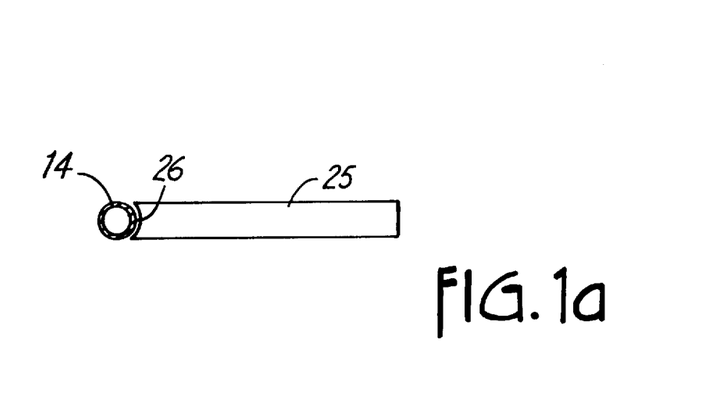

The cavity 23 of the heated body 12 is open, so that it may fill with ambient air. The coolant inlet tube 25 is positioned in the cavity 23, with an outlet of the tube 25 separated from the flow tube 14 by a small coolant flow gap 26, as is best shown in FIG. 1.a. The tube 25 defines a coolant inlet passage. A flow of coolant provided from an external coolant supply source to the coolant inlet tube will flow along the flow tube 14 through the coolant flow gap 26, then will flow in a pattern away from the flow tube 14 (and generally out of the cavity 23) as coolant exhaust, as is illustrated in FIG. 1. A valving region 24 of the flow channel 20 is created adjacent the coolant flow gap 26, wherein thermoplastic in the flow channel 20 will freeze when a flow of coolant is provided to the tube 25. Air is a preferred coolant, although it will be apparent to those skilled in the art that other gases or liquids can be successfully utilized as the coolant as well. The stagnant air in the cavity 23 acts as an insulator, insulating the tube 25 from the heated body 12.

The freeze valve apparatus 10 is employed to selectively extrude a thermoplastic flow through the discharge orifice 22 by selectively removing heat from the valving region 24 in the following manner. Heated body 12 is maintained at a the temperature at which the thermoplastic is flowable, thereby maintaining the flow channel at flowable temperature in the inlet and outlet regions of the flow tube 14. A flow of coolant having a temperature lower than the lowest flowable temperature of the thermoplastic is selectively and controllably provided to the coolant inlet tube 25 to valve on and off flow channel 20. When the coolant flow is low or stagnant, heat from the heated body 12 travels up from the outlet region of the flow tube 14 and travels down from the inlet region of flow tube 14. This heat transfer from heated body 12 brings the mid-section of the flow tube 14 and the thermoplastic in the entire flow channel 20, up to a temperature at which the thermoplastic is flowable. The flow channel 20 is said to be "valved on". Thermoplastic flows through the valving region 24 and is extruded through the discharge orifice 22. In contrast, when the coolant flow is high, heat transport vertically in the flow tube 14 is overwhelmed by lateral convection from the flow tube 14 into the coolant, so that the valving region 24 and the flow tube 14 in the vicinity of the valving region 24 is brought down to a temperature below the lowest flowable temperature of the thermoplastic. The temperature of the thermoplastic in the valving region 24 drops and its flow resistance increases, resulting in solidification of thermoplastic in the valving region 24. The flow of thermoplastic is stopped and the flow channel 20 is said to "valved off". Ceasing the flow of coolant into the coolant flow tube 25 will result in the flow channel 20 again becoming unobstructed in the valving region 24.

Figure 2:
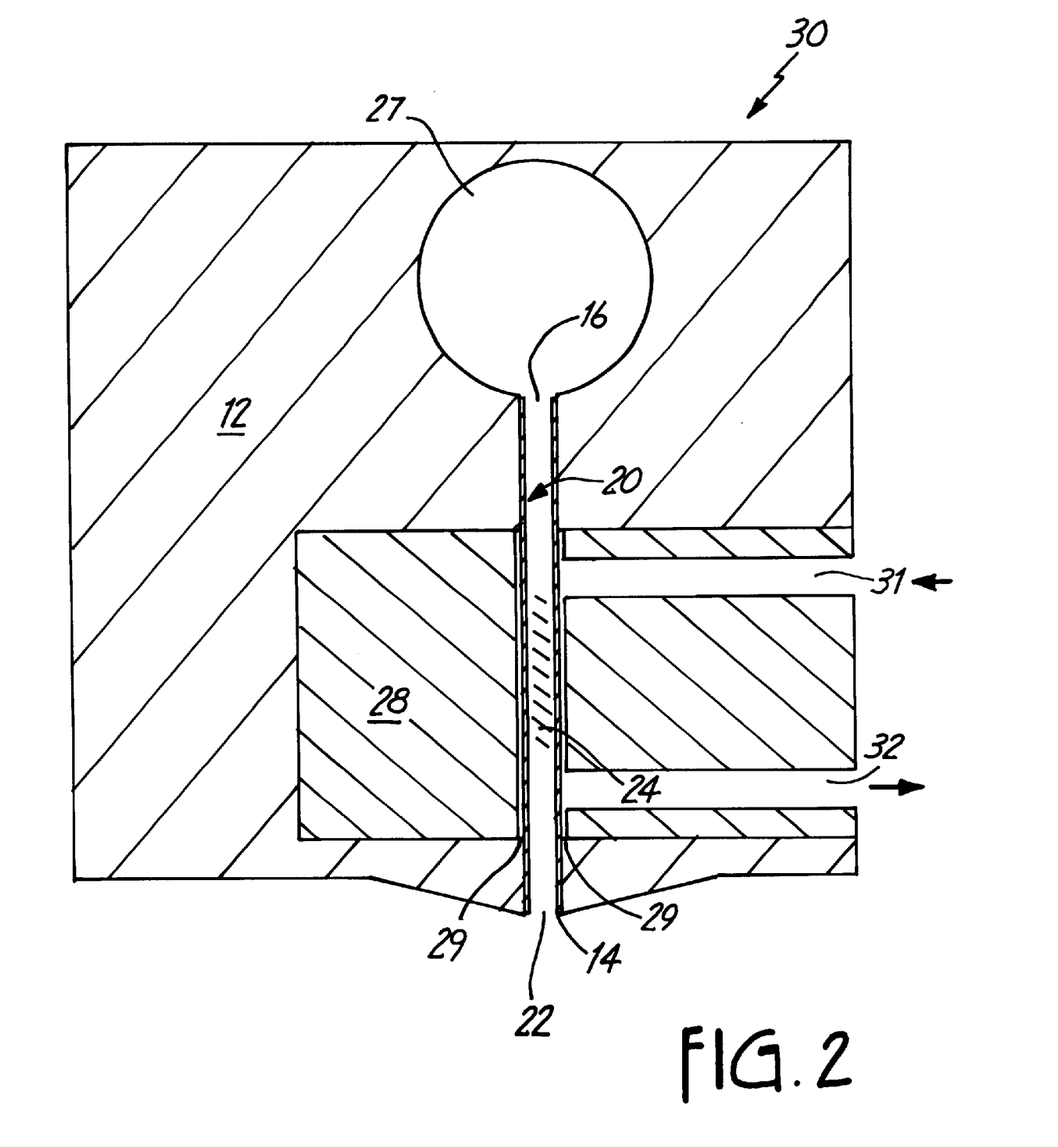
FIG. 2 is a sectional view of a second exemplary embodiment of a freeze valve apparatus according to the present invention.

A second exemplary embodiment of a freeze valve apparatus according to the present invention is shown in FIG. 2. In the freeze valve apparatus 30 shown in FIG. 2, the air tube 25 of the FIG. 1 embodiment is removed, being replaced with a thermal insulator block 28. Thermal insulator 28 fills the cavity 23, but is separated from flow tube 14 by a small coolant flow gap 29. The gap 29 is similar to the coolant flow gap 26, except the gap 29 extends between the insulator 28 and the tube 14 along the entire mid-section of the tube 14. The thermal insulator 28 is made of a material that is a poor thermal conductor, for instance, boron nitride, a high temperature plastics such as Ultem™ or PEEK™, or a high temperature aerogel such as silica. A coolant inlet passage 31 and a coolant exhaust passage 32 extend through the thermal insulator 28 from an external surface thereof to the coolant flow gap 29. The coolant inlet passage 31, the coolant flow gap 29 and the coolant exhaust passage 32 together define a coolant flow path. A flow of coolant provided into coolant flow inlet 31 will flow along the flow tube 14 through the coolant flow gap 29 and exit the coolant flow exhaust passage 32. The valving region 24 is created in the flow channel 20 adjacent the coolant flow path.

The freeze valve apparatus 30 is employed to selectively extrude a thermoplastic flow through the discharge orifice 22 in the same manner as the apparatus 10. A flow of coolant (such as air) having a temperature lower than the lowest flowable temperature of the thermoplastic is selectively and controllably provided to the coolant inlet passage 31 to valve on and off flow channel 20. When the coolant flow is low or stagnant, heat from the heated body 12 travels up from the outlet region of the flow tube 14 and travels down from the inlet region of flow tube 14. This heat transfer from heated body 12 brings the valving region 24 of the flow tube 14 and the thermoplastic therein up to a temperature at which the thermoplastic is flowable. When the coolant flow is high, heat transport vertically in the flow tube 14 is overwhelmed by lateral convection from the flow tube 14 into the coolant, so that thermoplastic in the valving region 24 solidifies.

Figure 3:
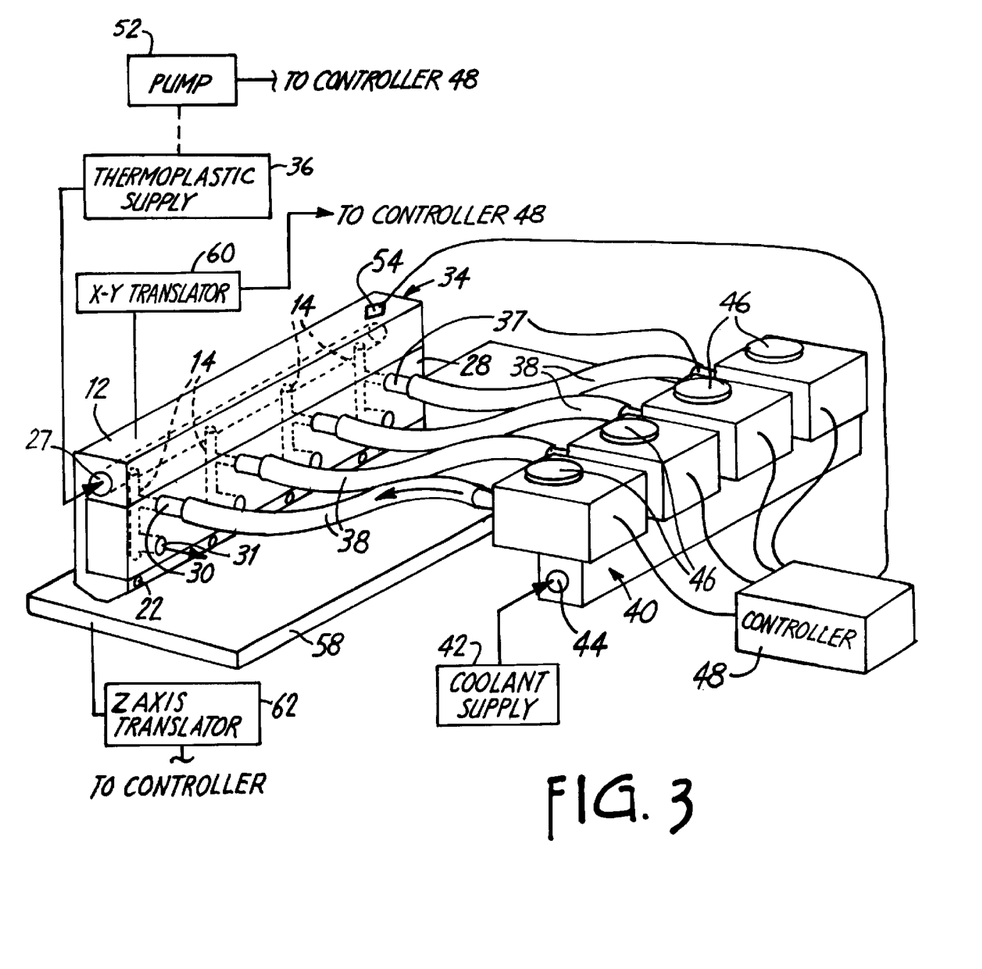
FIG. 3 is a perspective view of an apparatus for performing three-dimensional modeling, which incorporates the second embodiment of the freeze value apparatus in a four-valve array.

FIG. 3 shows an apparatus 33 for performing three-dimensional modeling, which incorporates the thermoplastic freeze valve apparatus 30 of the present invention in a four-valve extruder 34. Four flow tubes 14 extend through the single heated body 12. As shown, the flow tubes 14 are arranged in one-dimensional array. A single thermal insulator 28 surrounds the mid-section of each flow tube 14, separated therefrom by flow gaps 29. Alternatively, the flow tubes could be arranged in different configurations, different numbers of flow tubes could be used, and multiple thermal insulators could be utilized. A thermoplastic supply 36 provides pressurized thermoplastic to the supply manifold 27 of the heated body 12. Supply manifold 27 supplies thermoplastic to each of the four flow channels 20 defined by each of the four flow tubes 14. Each flow tube 14 has an associated coolant inlet passage 31 and coolant exhaust passage 32 which extend through the thermal insulator 28. Each fluid inlet passage 31 is coupled via a section of flexible hollow tubing 38, and connectors 37 at either end of each section of tubing 38, to a coolant control 40. The coolant control 40 comprises an interior manifold 44 that receives pressurized coolant from a coolant supply 42, and four solenoids 46 that regulate the flow of coolant from the manifold 44 to the fluid inlet passages 31. The tubing 38 provides flow paths for coolant from the manifold 44 to each inlet passage 31. The solenoids 46 are positioned within the coolant control 40 so as alternately to allow coolant in the manifold 44 to flow into the flow paths defined by the tubing 38, and to block coolant flow to such flow paths. Each solenoid 46 is independently actuated in response to signals from a controller 48, such that coolant flow to each inlet passage 31 is controlled independently. Coolant flows from the manifold 44 into the sections of tubing 38 that are open, to the associated flow tubes 14. By selectively providing coolant flow to the various flow tubes 14, the flow channels 20 are selectively valved-off, resulting in extrusion of thermoplastic through discharge orifices 22 in a preselected, variable extrudate configuration.

In order for each flow channel 20 in the array to operate independently, thermoplastic pressure in the supply manifold 27 must be maintained at a sufficiently high level, independent of the extrusion rate from the apparatus 34. The thermoplastic may be supplied to the apparatus in various forms, including a filament, rod, wafer or liquid. A pump means 52 acts on the thermoplastic supply 36 to provide the desired flow rate of pressurized thermoplastic. To assure sufficient pressure, a pressure sensor 50 (not shown) can be mounted in the manifold 32. Controller 48 can monitor and react to the measured pressure in an active control loop. The pumping means 52 is responsively controlled by signals from controller 48 to provide thermoplastic from the supply 36 at a desired pressure.

Similarly, in order to maintain heated body 12 at a temperature at which the thermoplastic is flowable, a temperature sensor 54 mounted on heated body 12 may be utilized. Temperature sensor 54 can be placed in a control loop with controller 48 monitoring and reacting to electrical feedback signals indicative of the measured temperature.

A preferred way to assemble a freeze valve apparatus according to the present invention is to press-fit the tube or tubes 14 into holes in the heated body 12. Using an aluminum block to form heated body 12, pressing in place a pre-drilled thermal insulator 28, then press-fitting each surgical stainless steel tube into a hole drilled by electric discharge machining (EDM) in the aluminum block has been demonstrated to be a particularly preferable method of manufacturing the apparatus. The tubes 14 may be cut to a final length after being pressed into the block, also by electric discharge machining.

The orifice 22 marks the transition from the extrusion apparatus to a build environment. In three-dimensional modeling applications, the build environment is a temperature controlled chamber in which models are built and in which the extruder 34 is moved in a predetermined spatial pattern with respect to a base 58 upon which a three-dimensional object is built. In the apparatus 33, an x-y translator 60 moves the extruder 34 in an x-y plane while a z-axis translator moves the base 62 along a z-axis.

Known rapid prototyping systems to which the present invention is applicable are disclosed, for example, in U.S. Pat. No. 5,121,329 and U.S. Pat. No. 5,764,521, assigned to Stratasys, Inc., which are hereby incorporated by reference. In the present invention, coolant flow is controlled in synchrony with the motion between the extruder and the base, to extrude thermoplastic at coordinate locations determined by a CAD drawing of the model to be build. Extrudate can be applied over or adjacent to previously extruded materials, as well as directly onto the base. An array of freeze valves according to the present invention are used in this manner to make patterns, features or models rapidly and with high resolution. The orifice diameter and relative positions of the flow tubes can be chosen so that a single pass of the freeze valve array over a region can solidly fill the region with a layer of thermoplastic.

Figure 4:
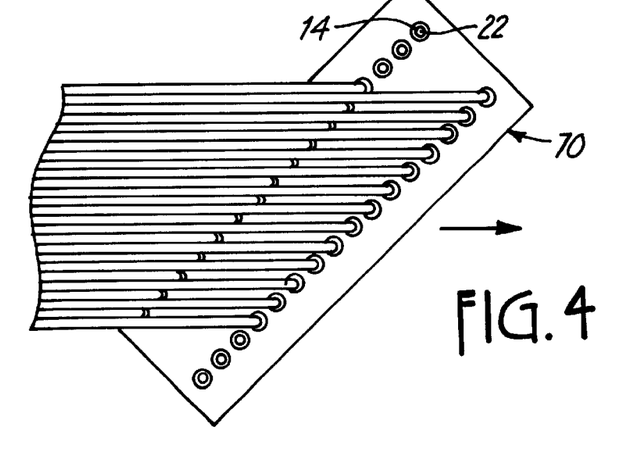
FIG. 4 is a bottom plan view of an extrusion head which embodies a two-dimensional array of freeze valves according to the present invention, shown extruding thermoplastic through selected orifices.

It should be understood that the freeze valve apparatus of the present invention can be implemented in various array configurations, as desired. For example, any m by n dimension array of freeze valves could be designed utilizing the present invention. FIG. 4 shows a two-dimensional array of freeze valves of the present invention embodied in an extrusion head 70. Extrusion head 70 is shown performing contiguous road deposition through selected orifices 22. As shown, extrusion head 70 is oriented at a 45° angle with respect to the direction of motion. The orientation shown allows fill roads of a model to alternate direction (horizontal to vertical) with each layer of the model being formed. Other angles allow alternative road widths.

Arranging the freeze valve apparatus of the present invention as an array allows variation of the spatial extrudate configuration of the thermoplastic. The temporal extrudate configuration (e.g., flow rate of the thermoplastic extrudate that emerges from the orifice 22) can also be varied using the present invention. The rate that thermoplastic is extruded from the orifice 22 at a given time is dependent on the amount of heat transfer from the flow channel to the coolant. Changing the temperature or flow rate of the coolant will effect the amount of heat transfer. Further, while a thermal valve generally is referred to herein in a binary sense of being open or closed, it is clear that the valve can have intermediate states, which will reduce the flow rate of the extruded thermoplastic. One approach is to connect several valves (such as air valves, diaphragm valves, butterfly valves, ball valves or gate valves) in parallel between the coolant control 40 and the tubing 38, with different constrictions following each of the valves. Another approach is to electronically servo the solenoids so that they may be position at a location other than full on or off.

In use, the freeze valve apparatus of the present invention must switch from open to closed and from closed to open in a time useful for the particular extrusion application. The switching time is a combination of several somewhat overlapping time intervals: actuation of the solenoid or other means for providing the coolant flow, change of air flow, change in flow tube temperature, change in the temperature and flow rate of the thermoplastic, and filling of voids in the flow channel (in the case of switching on). For three-dimensional modeling applications of the type described in the '329 and '521 patents, as a practical matter an extrusion head should deposit material at a linear speed of at least 0.1 inches per second, and have a 50 mil resolution of object features along the direction of travel, for efficient and accurate model building. The switch-on time for a freeze valve of the present invention in such applications should thus be no greater than about 500 milliseconds. As will be recognized by those skilled in the art, the switching time is dependent upon a number of factors, including the flow channel geometry, properties of the materials from which the freeze valve is made and material properties of the particular thermoplastic and coolant used in the application.

As to flow channel geometry, a thinner, shorter flow tube with a narrower flow channel will have a faster switching time. But, power dissipation and tolerances get more challenging as the tube gets shorter. As the flow channel gets narrower, axial flow resistance increases, since pressure drop through the length of the flow tube is a rather high power of the inverse of the diameter. Additionally, it is difficult, however, to filter most viscous thermoplastics to eliminate impurities smaller than about 2 mils, thus putting a lower limit on flow channel diameter.

Several techniques can be used to decrease the switching time of a freeze valve according to the present invention, while maintaining a satisfactory flow tube length and diameter. A momentary over-drive and under-drive technique can be used. The rate of opening is increased by momentarily providing substantially less coolant flow than is required to achieve the desired steady state increasing flow rate. The rate of closing can be increased by momentarily increasing the coolant flow more than is required to achieve the desired steady state decreasing flow rate. Another technique provides a heated fluid to the fluid flow path of the thermal insulator to increase the rate of opening once the coolant flow is ceased. A further technique implements a reduced flow channel cross-section in the region of the flow tube mid-section where the thermoplastic solidifies.

Figure 5:
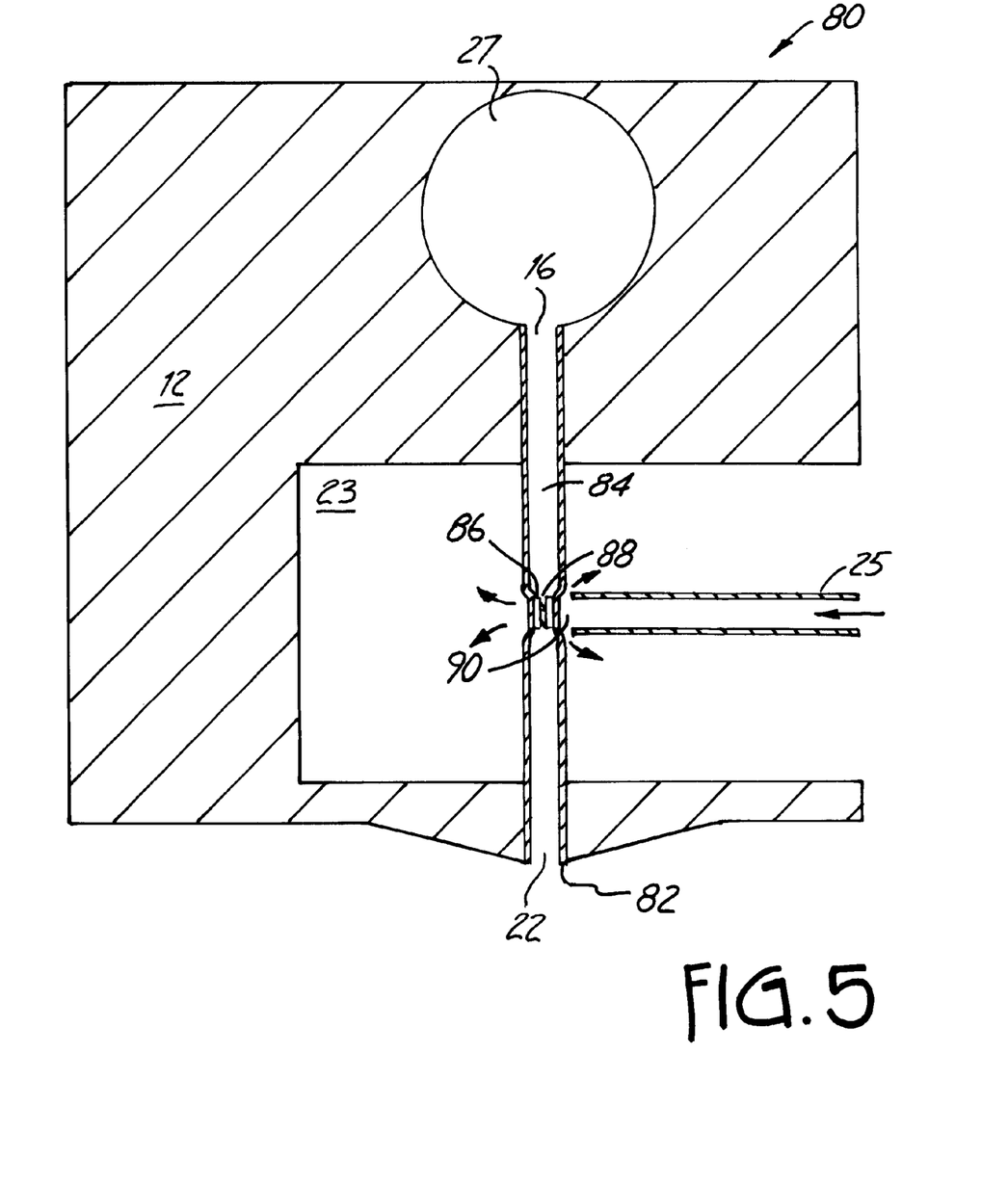
FIG. 5 is a sectional view of a third exemplary embodiment of a freeze valve apparatus according to the present invention.

The technique of reducing the flow channel cross-section in the valving region is illustrated in FIG. 5 as freeze valve apparatus 80. Freeze valve apparatus 80 is similar to freeze valve apparatus 10 of the FIG. 1 embodiment, except that the flow tube 14 in apparatus 10 is replaced with a flow tube 82 in apparatus 80. Flow tube 82 defines a thermoplastic flow channel 84 having an inlet 16 and an exit orifice 22. The flow tube 82 is constricted adjacent the outlet of the coolant inlet tube 25, thus reducing the cross-section of the flow channel 84 and creating a valving region 88 in the constricted region of tube 82. The constriction in the flow tube 82 provides a fast switching time for the apparatus 80, without significantly increasing the axial flow resistance in the channel 84. Optionally, a tubular insert 86 may be placed in the constricted region of the flow tube 82, thereby further reducing the cross-section of the flow channel 84 in the valving region 88. A micro-machined piece of silicon may be used as the insert 86.

The constricted embodiment of FIG. 5 optimizes the freeze valve design from a response time/flow resistance standpoint. The constriction creates an approximation to a rectangular flow passage so that the heat diffuses one-dimensionally (radially towards the center of the flow channel 84) rather than two-dimensionally. In the FIG. 5 embodiment, a practical minimum cross-section of flow channel 84 at the valving region 88 is about 3 mils, and a practical minimum length for the constriction in the flow tube 82 is about 5 mils.

The disclosed thermoplastic extrusion apparatus and method have applicability outside of three-dimensional modeling. For example, apparatus of the present invention can be used to deposit patterns of hot melt adhesive for assembly of clothing and other cloth articles, or to deposit a thixotropic alloy to create low-cost antennae for radio frequency (RF) identification tags.

EXAMPLE

An empirical example is provided of an array configuration of the freeze valve apparatus of the present invention. In this example, the thermoplastic is ABS (acrylonitrile butadiene styrene). We take the lowest flowable temperature of ABS to be 220° C. and the highest non-flowable temperature of ABS to be 110° C. Between these two temperatures ABS exhibits creep flow. The invention is implemented using 26-gauge 316 stainless steel tubing with a 0.018" outer diameter and a 0.012" inner diameter to form an array of sixteen flow tubes. Each flow tube has a length of 0.24 inches. A 6061 aluminum block serves as the thermally conductive body and the thermal insulator is Ultem pressed into the side of the aluminum block. The flow tubes are press-fit in the aluminum block so that both ends of each tube are captured by the block and the mid-section of each tube is surrounded by the Ultem, with a 0.002 inch thick gap separating each flow tube from the Ultem. A resistive heater maintains the block at 270° C. A plenum within the aluminum block supplies the ABS thermoplastic at 750 psi to the inlet of each tube. Sixteen electrically driven Numatech™ air solenoids are used as actuators to gate the flow of 25 psi room temperature compressed air through each of sixteen fluid inlet passages individually associated with each flow tube. Those solenoids are available from Numatech, Inc. of Wixom, Mich., and have characteristics desirable for use in the present invention. The Numatech™ solenoids are small, fast (<10 milliseconds switching time), relatively inexpensive and have a long useful life (more than 200 million cycles). When the solenoids block the flow of air into the fluid inlet passages, the thermoplastic flows through the tubes. When the solenoids allow the flow of approximately 0.1 cfm per passage, to selected flow tubes, the thermoplastic ceases to flowed through the effected tubes less than 100 milliseconds after the air flow began. When the solenoids again block the flow of air around the effected tubes, the thermoplastic flow through those tubes reaches 90% of its steady state flow rate in a time interval between 2 milliseconds and 200 milliseconds, depending on how many tubes had thermoplastic solidified in them and how long the thermoplastic had been solidified therein. The geometries and air pressures in this example generate peak air flow speeds in or around the flow gap in excess of Mach 1, thereby compressing the thermal boundary layers in the air flow path due to turbulence and increasing the heat transfer rate.

The freeze valve switching time of the above example could be increased by utilizing a thermoplastic having a higher thermal conductivity. ABS thermoplastic can be modified to increase thermal conductivity by adding ceramic filler powder to the ABS.

Although the present invention has been described with reference to preferred embodiments, workers skilled in the art will recognize that changes may be made in form and detail without departing from the spirit and scope of the invention. It should be understood that while this description is made by way of examples, the invention is defined by the scope of the claims.

What is claimed is:

1. A freeze valve apparatus for thermoplastic, comprising:
a thermally conductive body heated to a temperature at which a thermoplastic is flowable and having a cavity which contains a thermal insulator;
a thermally conductive hollow flow tube defining a flow channel for a flow of the thermoplastic and having an inlet region, an outlet region terminating in an exit orifice and a mid-section between the inlet and outlet regions, the flow tube extending through the thermally conductive body such that its inlet and outlet regions are captured within the thermally conductive body and its mid-section passes through the cavity; and means for directing a flow of coolant having a temperature lower than a lowest flowable temperature of the thermoplastic through the insulator in the cavity and around a portion of the flow tube mid-section, such that heat transfer to the coolant causes solidification of thermoplastic in the flow channel in a region of the flow tube mid-section.

2. The apparatus of claim 1, wherein the thermal insulator is stagnant air, and wherein the means for directing comprises a coolant inlet tube secured in the cavity such that an outlet of the coolant inlet tube is proximate the flow tube.

3. The apparatus of claim 1, wherein the thermal insulator is a block of material separated from the flow tube by a flow gap, and wherein the means for directing comprises the flow gap together with an inlet passage and an exhaust passage each extending through the thermal insulator to the flow gap.

4. The apparatus of claim 1, wherein the flow channel in the region of the flow tube mid-section in which the thermoplastic solidifies has a reduced cross-section.

5. The apparatus of claim 4, wherein the reduced cross-section is created by a tubular insert.

6. The apparatus of claim 1 and further comprising:
means for selectively providing the flow of coolant to the means for directing.

7. The apparatus of claim 6, wherein the means for selectively providing can be controlled to vary the flow rate of the flow of coolant.

8. The apparatus of claim 6, wherein a flow of ABS thermoplastic solidified in the flow channel will reach 90 percent of a steady state flow rate through the flow channel in 2–200 milliseconds time after the flow of coolant is ceased.

9. The apparatus of claim 1 and further comprising:
a thermoplastic supply manifold within the thermally conductive body and flowably connected to the inlet region of the flow tube.

10. The apparatus of claim 1, embodied in an extrusion head for three-dimensional deposition modeling.

11. The apparatus of claim 1, wherein the thermally conductive flow tube is press-fit into a hole in the thermally conductive body.

12. The apparatus of claim 11, wherein the thermally conductive flow tube is made of stainless steel and the thermally conductive body is made of aluminum.

13. The apparatus of claim 1, wherein the flow tube has a length of less than 1 inch and the flow channel diameter is less than 0.1 inches.

14. A method of manufacturing the apparatus of claim 1, comprising:
drilling a hole in the thermally conductive body by electric discharge machining; and
press-fitting the thermally conductive flow tube into the hole in the thermally conductive body.

15. The method of claim 14, and further comprising:
cutting the flow tube to a final length by electric discharge machining after it is press-fit into the thermally conductive body.

16. A freeze valve apparatus for thermoplastic, comprising:
a thermally conductive body heated to a temperature at which a thermoplastic is flowable and having a cavity which contains a thermal insulator;
a thermally conductive hollow flow tube extending through the thermally conductive body such that a mid-section thereof passes through the cavity, the flow tube having an inlet above its mid-section for receiving a flow of the thermoplastic and an exit orifice below its mid-section for discharging the thermoplastic; and
means for causing solidification of the thermoplastic in a region of the flow tube mid-section to valve-off the flow channel.

17. The apparatus of claim 16, wherein the means for causing solidification comprises:
a flow regulator which selectively provides a flow of coolant having a temperature lower than a lowest flowable temperature of the thermoplastic; and
means for contacting the flow of coolant with a portion of the flow tube mid-section.

18. The apparatus of claim 17, wherein the flow regulator is a solenoid.

19. The apparatus of claim 17, wherein a flow of ABS thermoplastic valving-off the flow channel will reach 90 percent of a steady state flow rate through the flow channel in 2–200 milliseconds time after the flow of coolant is ceased.

20. The apparatus of claim 16, wherein the thermally conductive flow tube is press-fit into a hole in the thermally conductive body.

21. The apparatus of claim 16, wherein the flow channel in the region of the flow tube mid-section in which the thermoplastic solidifies has a reduced cross-section.

22. The apparatus of claim 16 and further comprising:
a thermoplastic supply manifold within the thermally conductive body and flowably connected to the inlet of the flow tube.

23. The apparatus of claim 22 and further comprising:
a pressure sensor in the thermoplastic supply manifold.

24. The apparatus of claim 16, wherein the thermally conductive body includes a resistive element ohmically controlled in response to external electrical temperature control signals, and further comprising:
a temperature sensor mounted to the thermally conductive body for providing electrical feedback signals indicative of the temperature of the thermally conductive body, which feedback signals can be monitored by a controller and used by the controller to generate the temperature control signals.

25. The apparatus of claim 16, embodied in an extrusion head for three-dimensional deposition modeling.

26. The apparatus of claim 16, wherein a flow of ABS thermoplastic valving-off the flow channel will reach 90 percent of a steady state flow rate through the flow channel in 2–200 milliseconds time after the flow of coolant is ceased.

27. A multi-orifice freeze valve apparatus for thermoplastic, comprising:
a thermally conductive body heated to a temperature at which a thermoplastic is flowable and having a cavity which contains a thermal insulator;
a plurality of thermally conductive hollow flow tubes defining a plurality of flow channels for a flow of the thermoplastic, each flow tube having an inlet region, an outlet region terminating in an exit orifice through which thermoplastic is extruded and a mid-section between the inlet and outlet regions, and each flow tube extending through the thermally conductive body such that its inlet and outlet regions are captured within the thermally conductive body and its mid-section passes through the cavity; and
means for independently causing solidification of the thermoplastic in a region of each flow tube mid-section to selectively valve-off the flow channels.

28. The apparatus of claim 27, wherein the means for independently causing solidification comprises:
   a plurality of flow regulators, each associated with one of the plurality of flow tubes, which selectively provide a flow of coolant having a temperature lower than a lowest flowable temperature of the thermoplastic; and
   means for contacting the flow of coolant with a portion of each flow tube mid-section.

29. The apparatus of claim 28, wherein the flow regulators each comprise a solenoid.

30. The apparatus of claim 28, wherein the thermal insulator is stagnant air, and wherein the means for contacting comprises a plurality of coolant inlet tubes each associated with one of the plurality of flow regulators and secured in the cavity such that an outlet of each coolant inlet tube is proximate one of the plurality of flow tubes.

31. The apparatus of claim 28, wherein the thermal insulator is a solid material and wherein the means for contacting comprises a flow gap interposed between each flow tube and the thermal insulator together with a plurality of inlet passage and an exhaust passage pairs each extending through the thermal insulator to the flow gap of an associated one of the flow tubes, each such inlet passage being associated with one of the plurality of flow regulators.

32. The apparatus of claim 28, wherein a flow of ABS thermoplastic valving-off any one of the flow channels will reach 90 percent of a steady state flow rate through the flow channel in 2–200 milliseconds time after the flow of coolant is ceased.

33. The apparatus of claim 27 and further comprising:
   a thermoplastic supply manifold flowably connected to the inlet region of each flow tube.

34. The apparatus of claim 33, wherein the thermoplastic supply manifold is within the thermally conductive body.

35. The apparatus of claim 33 and further comprising:
   pumping means for providing flowable thermoplastic to the supply manifold in response to pump control signals from a controller.

36. The apparatus of claim 35 and further comprising:
   a pressure sensor in the thermoplastic supply manifold for providing electrical feedback signals to the controller indicative of the pressure in the manifold, which feedback signals are used by the controller to generate the pump control signals.

37. The apparatus of claim 27, wherein the thermally conductive body includes a resistive element ohmically controlled in response to external electrical temperature control signals, and further comprising:
   a temperature sensor mounted to the thermally conductive body for providing electrical feedback signals indicative of the temperature of the thermally conductive body, which feedback signals can be monitored by a controller and used by the controller to generate the temperature control signals.

38. The apparatus of claim 27, wherein the plurality of thermally conductive flow tubes are press-fit into a plurality of holes in the thermally conductive body.

39. The apparatus of claim 27, wherein the low channels have a reduced cross-section in the region of each flow tube mid-section wherein thermoplastic solidifies.

40. The apparatus of claim 27, wherein each flow tube has a length of less than 1 inch and each flow channel diameter is less than 0.1 inches.

41. The apparatus of claim 27, wherein the exit orifices are aligned in a one-dimensional array.

42. The apparatus of claim 27, wherein the exit orifices are aligned in a two-dimensional array.

43. The apparatus of claim 27, embodied in a machine that builds up three-dimensional objects in multiple layers onto a base by extruding thermoplastic from selected orifices of the apparatus in synchrony with relative movement of the apparatus and the base in a predetermined spatial pattern.

* * * * *

UNITED STATES PATENT AND TRADEMARK OFFICE
CERTIFICATE OF CORRECTION

PATENT NO. : 6,578,596 B1  
DATED : June 17, 2003  
INVENTOR(S) : John Samuel Batchelder et al.

It is certified that error appears in the above-identified patent and that said Letters Patent is hereby corrected as shown below:

Column 12,
Line 20, delete "low", insert -- flow --

Signed and Sealed this

Twenty-first Day of September, 2004

JON W. DUDAS
*Director of the United States Patent and Trademark Office*